Figure 1:
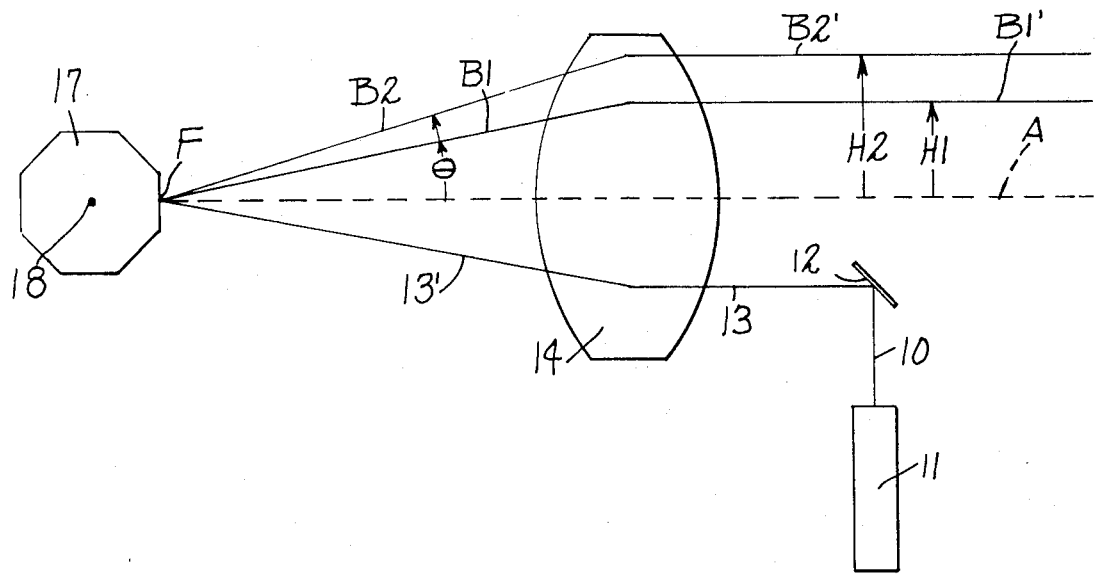

United States Patent
Lawson

[11] 3,973,833
[45] Aug. 10, 1976

[54] LENS WHERE THE LIGHT RAYS OBEY THE RELATION H=KFθ

[75] Inventor: John A. Lawson, Scarborough, Canada

[73] Assignee: Zygo Corporation, Middlefield, Conn.

[22] Filed: July 31, 1974

[21] Appl. No.: 493,339

[52] U.S. Cl. .................... 350/232; 350/7; 350/202
[51] Int. Cl.² .............. G02B 9/04; G02B 27/17; G02B 17/00
[58] Field of Search ............ 350/175 R, 232, 202, 350/7

[56] References Cited
UNITED STATES PATENTS

| | | |
|---|---|---|
| 2,272,604 | 2/1942 | Everitt .................. 350/202 |
| 2,453,218 | 11/1948 | Grey .................... 350/232 |
| 2,764,064 | 9/1956 | Kohler .................. 350/232 |
| 3,853,406 | 12/1974 | Zanoni .................. 356/167 |

*Primary Examiner*—John K. Corbin
*Assistant Examiner*—Conrad Clark
*Attorney, Agent, or Firm*—DeLio and Montgomery

[57] ABSTRACT

A two-element lens which provides an emerging beam of a height H from the optical axis where H is proportional to the product of the focal length of the lens and an angle made by an incident beam emanating from the focal point of the lens on the optical axis thereof.

3 Claims, 2 Drawing Figures

LENS WHERE THE LIGHT RAYS OBEY THE RELATION H=KFθ

This invention relates to lenses, and more particularly relates to lenses where the aperture limited image height is a direct function of the angle of a light source with the optical axis.

In many applications it is desired to convert angular motion of a beam of light to linear motion in direct proportion. One application where this is desirable is in optical scanning devices wherein movement of a light beam is produced by reflection of the beam from a rotating mirror.

Generally in the design of lenses an attempt is made to satisfy the sine condition; that is, the magnification of the optical system is substantially equal to the ratio of index of refraction times the sine of the angle of incidence on the object side to the index of refraction times the sine of the image height on the object side. This is referred to as the Abbe sine condition. When this condition is satisfied the image will be free of coma in the near axial region.

However, in the present invention the lens elements are selected to introduce the necessary coma to take the lens out of the sine condition and thereby permit the image ray height to be directly proportional to the angle of incidence of a light beam with respect to the optical axis as a function of the focal length of the lens.

Briefly stated, this is achieved in one form by providing a light source essentially at the focal point of the lens on the optical axis thereof which light source moves angularly to direct a beam at the lens. The emerging image beam has a height with respect to the optical axis of the lens which is directly proportional to the angle defined between the incident beam and the optical axis. This is achieved in a two-element lens system wherein the first lens is a bi-convex lens designed to introduce coma into the system, and the second lens element is a concave-convex element. The lens elements bear certain relationship to each other and the overall optical system, as hereinafter described.

An object of this invention is to provide a new and improved lens which will produce a linear beam of a height from the optical axis which is directly proportional to the angle of incident beam thereon.

Another object of this invention is to provide such a lens which is relatively simple in construction and utilizes a minimum of lens elements.

A further object of this invention is to provide a lens which eliminates the normal sine condition of relationship between the angle of the incident light and the height of a transmitted beam of light so that the beam height follows the function $H = KF\theta$, where $H$ is the beam or ray height, $F$ is the focal length of the lens, $\theta$ is the angle in radians, and $K$ is approximately unity.

Figure 2:
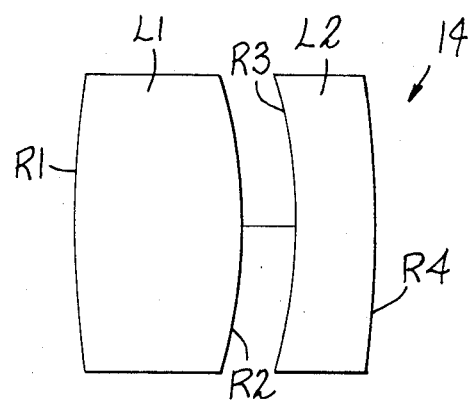

The features of the invention which are believed to be novel are paticularly pointed out and distinctly claimed in the concluding portion of this specification. However, the invention both as to its organization and operation, together with further objects and advantages thereof, may best be appreciated by reference to the following detailed description taken in conjunction with the drawings, wherein:

FIG. 1 is a schematic view of a system in which a lens embodying the invention may be utilized, and FIG. 2 is a representation of a lens embodying the invention.

The arrangement shown in FIG. 1 is adapted to be used in an optical inspection system of the type disclosed in copending application, Ser. No. 421,247 of Carl Zanoni, filed Dec. 3, 1973, now U.S. Pat. No. 3,853,406, and assigned to the same assignee as the present invention.

As represented, a beam of light 10 is projected from a concentrated light source, such as a laser 11 towards a mirror 12. Mirror 12 reflects the beam 10 as a beam 13 parallel to the optical axis A and through a lens system 14 as a beam 13′ to the focal point F of the lens. At the focal point is disposed an angularly moving or rotating polygonal scanner which may be in the form of a symmetrically formed mirror 17 with reflecting surfaces or may take any other convenient form. The mirror 17 rotates about an axis 18 and is driven by a constant speed motor (not shown). As the mirror surfaces rotate, the reflected beams, shown as beams B1, B2, move through an angle $\theta$ and emanate on the opposite side of the lens 14 as beams B1′ and B2′ at heights H1 and H2, respectively, from the optical axis A.

It will be understood that this is merely one embodiment in which the lens system 14 may be utilized. The light source 11 together with suitable mirror may be positioned at any point so as to produce the necessary incident beam to focal point F. Alternatively, any other rotating or angularly moving light source could be provided at the focal point F.

A lens embodying the invention is shown in FIG. 2 and comprises a first bi-convex element L1 having object and image surfaces R1, R2, respectively, and a second concave-convex element having object and image side surfaces R3 and R4, respectively. The data on such lens as scaled for a relative aperture of substantially $f/5.0$, and equivalent focal length of 250mm is set forth in Table I below:

TABLE I

| | | Radii (mm) | Axial Distance Between Surfaces (mm) | $N_d$ | $V_d$ |
|---|---|---|---|---|---|
| L1 | R1 | 482.404 | | | |
| | | | 14.00 | 1.648 | 33.85 |
| | R2 | − 89.301 | | | |
| | | | 7.76 | | |
| L2 | R3 | − 82.404 | | | |
| | | | 6.60 | 1.762 | 26.53 |
| | R4 | −174.752 | | | |

Where $N_d$ is the index and $V_d$ is the Abbe Number, both referred to the d-line of sodium.

To take the lens out of the sine condition by introducing the necessary coma, and thereby satisfy the equation $H = KF\theta$, the radii of surfaces R2 and R3 are defined to satisfy the relation $$.37F_o \geq R_{2,3} \geq .30F_o$$
and
$$.10F_o \geq D_2 \geq .02F_o$$

Where $F_o$ is the equivalent focal length of the lens, $R_{2,3}$ is the radii of surfaces $R_2$ or $R_3$, and $D_2$ is the axial distance between surfaces $R_2$ and $R_3$.

Additionally, to correct for spherical aberration the radii of surfaces R2 and R3 should differ by no more than ten percent.

Also, the index of refraction $N_d$ is held fairly high, that is, 1.6 or greater to simultaneously obtain the necessary coma and correct spherical aberration. This index may be varied in view of the chosen wavelength.

In the particular case it is chosen for a helium neon laser which emits light at a wavelength of 0.6328 microns.

With this arrangement, the image side beam B' is always maintained parallel to the optical axis A and at a height H therefrom proportional to the product of the focal length and the angle $\theta$ expressed in radians. The constant K is near unity.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens adapted to transmit an angularly varying beam of light originating from a point on the optical axis thereof and essentially at a focal point of said lens in a path parallel to the optical axis of said lens on the image side thereof, said lens having a predetermined focal length F, the angle between the incident beam and the optical axis of the lens being $\theta$ and the height of the image beam from the optical axis being H, said quantities bearing a relationship $H = KF\theta$, said lens from the angularly varying light source consisting of a first bi-convex element and a second concave-convex element having its image side surface defined on a greater radius than its object surface and the axial spacing between said lenses on the optical axis being between two and ten percent of the equivalent focal length of the overall lens, and the curvature of the facing surfaces of the lens elements are equal to or greater than 0.30 of the equivalent focal length of said lens and equal to or less than 0.37 of the equivalent focal length of said lens, and K is approximately unity, the index of refraction of both of said lens elements referred to the D-line of sodium being greater than 1.6, whereby coma is introduced into said lens and said lens is taken out of the sine condition.

2. The lens of claim 1 defined substantially by the following data as scaled to an equivalent focal length of 250mm.

|    |    | Radii(mm) | Axial Distance Between Surfaces | $N_d$ | $V_d$ |
|----|----|-----------|----------------------------------|-------|-------|
| L1 | R1 | 482.404   |                                  |       |       |
|    |    |           | 14.00                            | 1.648 | 33.85 |
|    | R2 | − 89.301  |                                  |       |       |
|    |    |           | 7.76                             |       |       |
| L2 | R3 | − 82.404  |                                  |       |       |
|    |    |           | 6.60                             | 1.762 | 26.53 |
|    | R4 | −174.752  |                                  |       |       |

Where $N_d$ is the index and $V_d$ is the Abbe Number, both referred to the d-line of sodium.

3. The lens of claim 1 adapted to be used with a light source having a wavelength of essentially 0.6328 microns.

* * * * *